US008085501B2

(12) United States Patent
Martin

(10) Patent No.: US 8,085,501 B2
(45) Date of Patent: Dec. 27, 2011

(54) READER INCLUDING AN INTERPOSER THAT PREVENTS COUPLING WITH WRITE-PROTECTED DATA CARTRIDGES

(75) Inventor: Robert C. Martin, St. Paul, MN (US)

(73) Assignee: Imation Corp., Oakdale, MN (US)

( * ) Notice: Subject to any disclaimer, the term of this patent is extended or adjusted under 35 U.S.C. 154(b) by 868 days.

(21) Appl. No.: 12/011,734

(22) Filed: Jan. 29, 2008

(65) Prior Publication Data

US 2009/0190258 A1 Jul. 30, 2009

(51) Int. Cl.
*G11B 23/03* (2006.01)

(52) U.S. Cl. .......... 360/133

(58) Field of Classification Search .......... None
See application file for complete search history.

(56) References Cited

U.S. PATENT DOCUMENTS

| | | | | |
|---|---|---|---|---|
| 4,359,762 | A * | 11/1982 | Stollorz | 360/98.07 |
| 4,460,930 | A * | 7/1984 | Takahashi | 360/60 |
| 5,214,550 | A * | 5/1993 | Chan | 360/97.01 |
| 5,280,398 | A * | 1/1994 | Wade et al. | 360/60 |
| 6,104,561 | A | 8/2000 | Braithwaite et al. | |
| 6,739,515 | B1 | 5/2004 | Wallace | |
| 7,145,460 | B1 | 12/2006 | Wojciechowski et al. | |
| 7,224,545 | B2 | 5/2007 | Saliba et al. | |
| 7,324,347 | B2 * | 1/2008 | Nakanishi et al. | 361/737 |
| 2001/0017329 | A1 * | 8/2001 | Krula et al. | 242/340 |
| 2008/0248672 | A1 * | 10/2008 | Yip | 439/300 |

* cited by examiner

*Primary Examiner* — David D Davis
(74) *Attorney, Agent, or Firm* — Shumaker & Sieffert, P.A.

(57) ABSTRACT

A removable hard disk drive storage system includes a data storage cartridge having a write protect switch, and a reader configured to couple to and read data from the data storage cartridge. The reader includes a physical block that aligns with the write protect switch of the data storage cartridge. The physical block aligns with the write protect switch of the data storage cartridge to prevent the reader from coupling to the data storage cartridge when the write protect switch is in a write protect position.

20 Claims, 7 Drawing Sheets

READER INCLUDING AN INTERPOSER THAT PREVENTS COUPLING WITH WRITE-PROTECTED DATA CARTRIDGES

BACKGROUND

Mass storage devices, such as hard disk drives and optical disk drives, have become popular data storage components that are useful in storing data, and backing up stored data, in computer systems and businesses. For example, mass storage devices have become the preferred tool for backing up stored data and/or securing data across nearly all sectors of business and industry.

Recently, mass storage devices have been developed that are mobile, and thus permit modular and removable data backup of systems and businesses. It is desirable to have a mobile or portable reader that is able to inexpensively and conveniently read the data stored on the mobile storage devices. However, configuring the mobile/portable readers to be fully functional and electrically configured to sense the conditions of the mobile storage devices would undesirably increase the cost and complexity of the readers.

For these and other reasons, there is a need for the present invention.

SUMMARY

One aspect provides a removable hard disk drive storage system. The system includes a data storage cartridge having a write protect switch, and a reader configured to couple to and read data from the data storage cartridge. The reader includes a physical block that aligns with the write protect switch of the data storage cartridge. The physical block aligns with the write protect switch of the data storage cartridge to prevent the reader from coupling to the data storage cartridge when the write protect switch is in a write protect position.

Another aspect provides a removable hard disk drive storage system including a data storage cartridge having a write protect switch, and a reader having an interface that is coupleable to the data storage cartridge. The interface including an interposer that extends from the interface, the interposer configured to prevent the reader from coupling to the data storage cartridge only when the write protect switch is in a write protect position.

Another aspect provides a method of preventing data from being inadvertently overwritten on a data storage cartridge. The method includes providing a removable data storage system including at least one data cartridge and a read device that connects with the data cartridge(s) prior to transferring data with the data cartridge(s), and preventing the read device from connecting with write protected data cartridges.

BRIEF DESCRIPTION OF THE DRAWINGS

The accompanying drawings are included to provide a further understanding of embodiments and are incorporated in and constitute a part of this specification. The drawings illustrate embodiments and together with the description serve to explain principles of embodiments. Other embodiments and many of the intended advantages of embodiments will be readily appreciated as they become better understood by reference to the following detailed description. The elements of the drawings are not necessarily to scale relative to each other. Like reference numerals designate corresponding similar parts.

DETAILED DESCRIPTION

In the following Detailed Description, reference is made to the accompanying drawings, which form a part hereof, and in which is shown by way of illustration specific embodiments in which the invention may be practiced. In this regard, directional terminology, such as "top," "bottom," "front," "back," "leading," "trailing," etc., is used with reference to the orientation of the Figure(s) being described. Because components of embodiments can be positioned in a number of different orientations, the directional terminology is used for purposes of illustration and is in no way limiting. It is to be understood that other embodiments may be utilized and structural or logical changes may be made without departing from the scope of the present invention. The following detailed description, therefore, is not to be taken in a limiting sense, and the scope of the present invention is defined by the appended claims.

It is to be understood that the features of the various exemplary embodiments described herein may be combined with each other, unless specifically noted otherwise.

Embodiments provide a reader having an interface for coupling with a data cartridge, where the interface includes an interposer that prevents the reader from coupling to the data storage cartridge when a write protect switch of the cartridge is in a write protect position and enables the reader to couple with the data storage cartridge when the write protect switch is in a write enabled position. Thus, the interposer is configured to prevent the reader from coupling to the data storage cartridge only when the write protect switch of the cartridge is in the write protect position.

Figure 1:
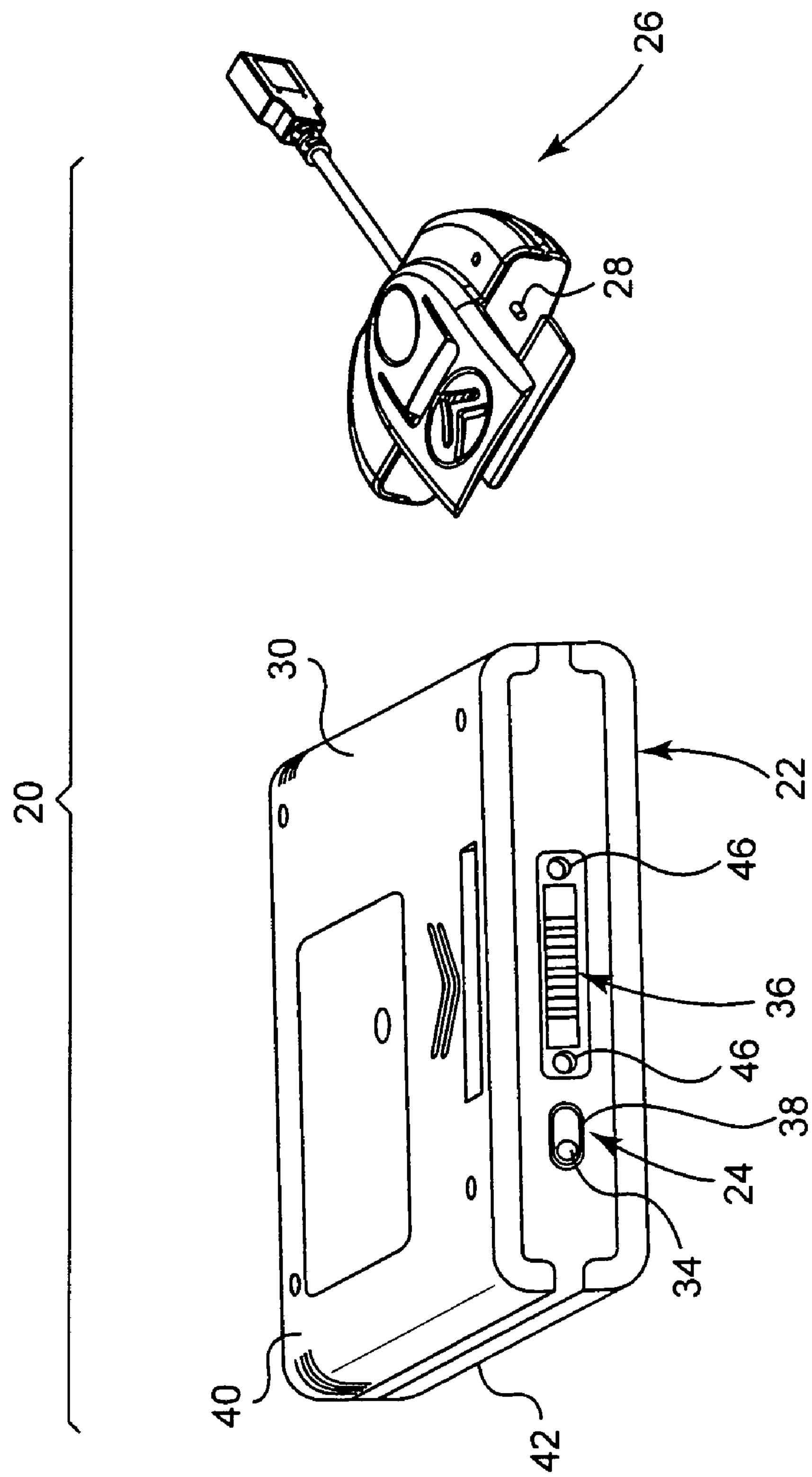
FIG. 1 is a perspective view of a removable hard disk drive storage system including a data cartridge and a mobile adapter configured to couple with the data cartridge according to one embodiment.

FIG. 1 is a perspective view of a removable hard disk drive storage system 20 according to one embodiment. The removable hard disk drive storage system 20 (system 20) includes a data storage cartridge 22 having a write protect switch 24 and a mobile adapter 26 including a physical block 28 that is configured to prevent the mobile adapter 26 from coupling to the data storage cartridge 22 when the write protect switch 24 is in a write protect position. The physical block 28 thus prevents the mobile adapter 26 from coupling with the data storage cartridge 22 and undesirably writing over data stored on the data storage cartridge 22 unless the write protect switch 24 is in a write enabled position. In this specification, the term "physical block" means a structure that mechanically blocks the data storage cartridge 22 from electrically coupling with the mobile adaptor 26. The mobile adapter 26 is thus simplified as it does not electrically or otherwise "sense" the write status of the data storage cartridge 22. The mobile adapter 26 connects to data storage cartridges that are write enabled, and does not connect to data storage cartridges that are write protected.

In one embodiment, the data storage cartridge 22 includes a housing 30 enclosing memory components such as a hard drive (not shown), the write protect switch 24 that includes a mechanical sliding button 34, and a connection terminal 36 electrically communicating with the hard drive.

In one embodiment, the hard drive includes hard disk drives and/or other solid state storage media. Suitable solid state storage media include non-volatile memory such as erasable programmable read-only memory, electrically-erasable programmable read-only memory, flash memory, or other suitable memory. In one embodiment, the hard disk within the data storage cartridge 22 is a non-tape data storage medium providing random data storage access.

In one embodiment, the housing 30 includes a first housing section 40 opposite a second housing section 42, where the first and second housing sections 40, 42 combine to enclose the hard drive while providing access to the write protect switch 24 and the connection terminal 36. In one embodiment, the housing 30 is rectangular in shape, portable, and configured for use in data storage systems and data storage libraries.

In one embodiment, the write protect switch 24 includes the slidable button 34 that is configured to move within a channel 38 between a write protect position (as shown) and a write enabled position in which the button 34 is slid toward (i.e., nearest to) the connection terminal 36. The write protect switch 24 includes mechanical switches or other mechanical devices that are movable between a write protect position and a write enabled position. When the button 34 is in the write protect position, the data storage cartridge 22 is not write-accessible and the data stored on the cartridge cannot be written over. The write protect switch 24 thus prevents the user from unintentionally deleting file(s). The write protect switch 24 can be moved to a write enabled position that enables data to be written to the cartridge. It is to be understood that the write protect switch 24 can include icons or other symbols to indicate the write protect position (e.g., a lock), the write enabled position (e.g., an open lock), or other suitable iconology.

In one embodiment, the connection terminal 36 provides a plurality of contacts including ground, power, data signals, or other electrical contacts. In one embodiment, the connection terminal 36 includes a Serial Advanced Technology Attachment (SATA) connector having, for example, twenty-two connection terminals including signal connectors laterally spaced from the power and/or ground connectors.

In one embodiment, the data storage cartridge 22 optionally includes alignment apertures 46 that are configured to guide connectors of a reader/writer when the reader/writer is coupled with the connection terminal 36.

Figure 2:
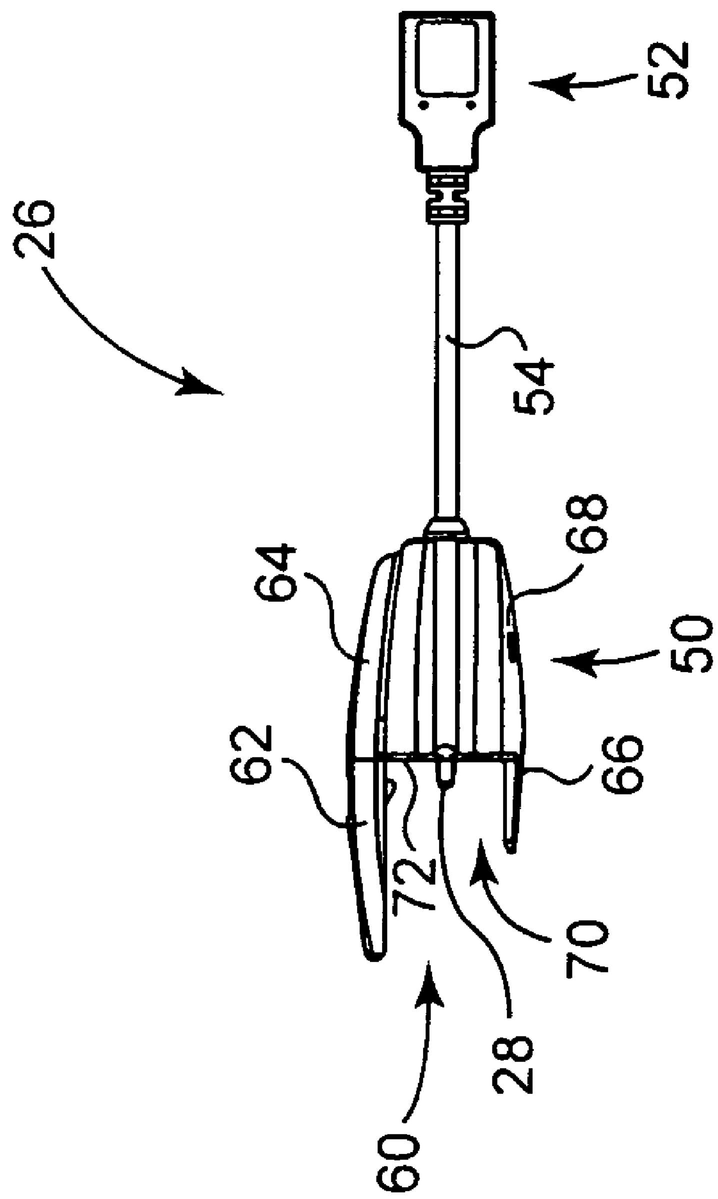
FIG. 2 is a side view of the mobile adapter shown in FIG. 1.

FIG. 2 is a side view of the mobile adapter 26 according to one embodiment. The mobile adapter 26 includes a cartridge connector 50, a data port 52, and a cable 54 extending between the cartridge connector 50 and the data port 52. In one embodiment, the mobile adapter 26 is configured to read data stored to the data storage cartridge 22 (FIG. 1) and is compact and portable.

In one embodiment, the cartridge connector 50 includes a SATA compatible connection terminal configured for coupling to the connection terminal 36 of the data storage cartridge 22 (FIG. 1) and the data port 52 is configured to plug into a computer, a host memory device, or other electronic device. In this manner, data is exchanged between the data storage cartridge 22 and the computer to which the data port 52 is connected.

In one embodiment, the data port 52 is a universal serial bus (USB) connector and cable 54 electrically couples USB connector 52 with the cartridge connector 50. In one embodiment, the cartridge connector 50 includes a bridge chip (not shown) configured to convert the SATA connection at the cartridge connector 50 into a usable USB format.

In one embodiment, the cartridge connector 50 includes a snap mechanism 60 configured to enable the cartridge connector 50 to removably couple to the data storage cartridge 22 (FIG. 1). The snap mechanism 60 includes a first flange 62 coupled to a first major surface 64 of cartridge connector 50, a second flange 66 coupled to a second major surface 68 of cartridge connector 50, and a connector face 72 extending between the first and second flanges 62, 66. In one embodiment, the first and second flanges 62, 66 are opposed one to the other in a substantially parallel manner that defines a gap 70 between the first and second flanges 62, 66 that is sized to receive the data storage cartridge 22. To this end, the connector face 72 extending between the first and second flanges 62, 66 defines a connector interface that is coupleable to the data storage cartridge 22.

In one embodiment, the physical block 28 is a post disposed in the gap 70 that extends from the connector face 72 substantially parallel to the first and second flanges 62, 66. In one embodiment, the post/physical block 28 extends substantially perpendicular from the connector face 72. The post 28 includes rigid plastic posts that are integrally formed as part of the connector face 72. In one embodiment, the physical block 28 is an interposer, a block, a geometric protrusion, or any other suitable projection that is configured to prevent the mobile adapter 26 from coupling to and accessing data of the data storage cartridge 22 (FIG. 1) when the write protect switch 24 (FIG. 1) is in the write protect position.

The mobile adapter 26 is generally lightweight, portable, and configured to provide electrical connection between the data storage cartridge 22 and a computer. Suitable materials for fabricating the cartridge connector 50 include plastic materials formed into a housing over the bridge chip and providing support for the cable 54 extending from the cartridge connector 50.

Figure 3:
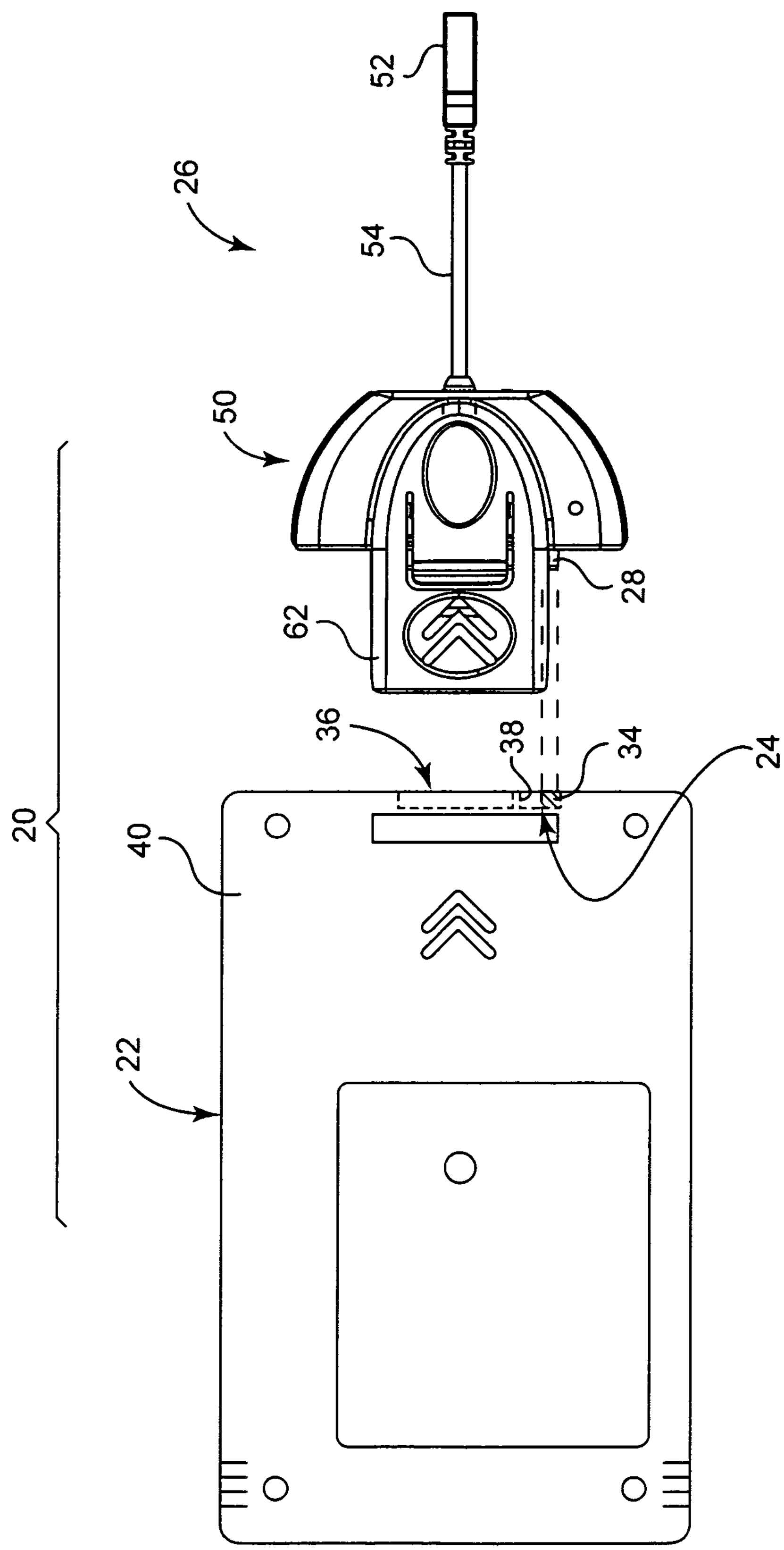
FIG. 3 is a top view of the mobile adapter shown in FIG. 1 that is prevented from coupling to a write protected data cartridge as shown in FIG. 1 according to one embodiment.

FIG. 3 is a top view of system 20. The button 34 of the write protect switch 24 is in the write protect position after being moved within the channel 38 to a location furthermost from the connection terminal 36. Those of skill in the art will recognize that the location of the write protect switch 24 when in the write protect position is not a limiting factor, since embodiments provided herein accommodate any position of the write protect switch 24. The mobile adapter 26 is usable to read data from the data storage cartridge 22, except when the write protect switch 24 is in the illustrated write protect position.

The physical block 28 is configured to align with the button 34 when the write protect switch 24 is in the write protect position. Consequently, the physical block 28 touches the button 34 and prevents the cartridge connector 50 from electrically coupling with the connection terminal 36. The reader or mobile adapter 26 is unable to sense a status of the write protect switch 24. However, the physical block 28 provides a mechanism that prevents the reader/mobile adapter 26 from coupling to the data storage cartridge 22 when the button 34 of the write protect switch 24 is in the write protect position. In one embodiment, the physical block 28 prevents the mobile adapter 26 from read/write connecting to data storage cartridges that are write protected. In one embodiment, the physical block 28 prevents the mobile adapter 26 from coupling with data storage cartridges that are write protected.

Figure 4:
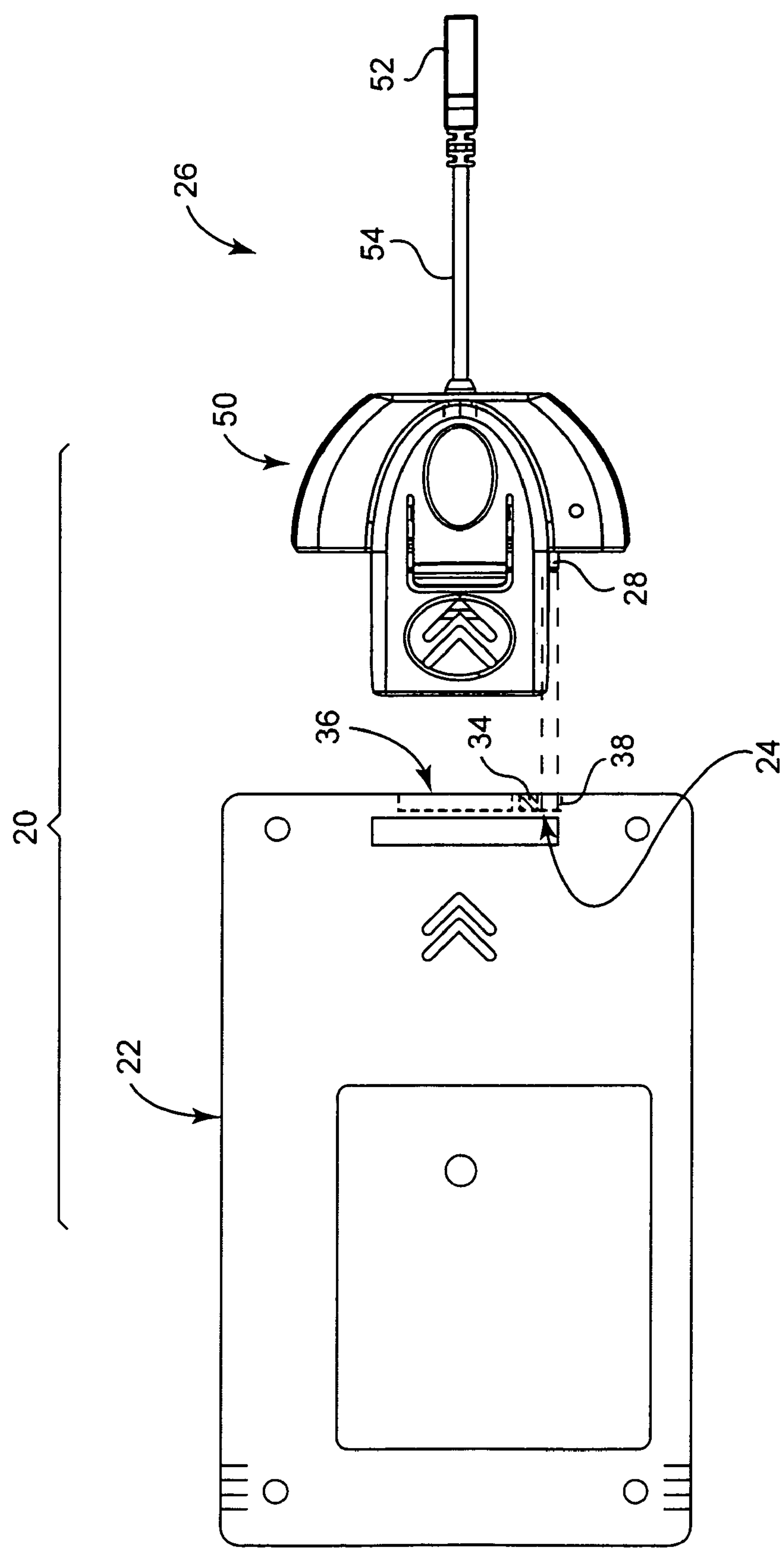
FIG. 4 is a top view of the mobile adapter shown in FIG. 1 that is enabled to couple with a write enable data cartridge according to one embodiment.

FIG. 4 is a top view of the system 20 according to another embodiment. The data storage cartridge 22 is in a write enabled position in which the button 34 of the write protect switch 24 has been moved within the channel 38 toward the connection terminal 36. The mobile adapter 26 is thus configured such that the snap mechanism 60 (FIG. 2) snaps over or couples to the data storage cartridge 22 and the cartridge connector 50 couples to the terminal connection 36. The physical block 28 aligns with a void in the channel 38 of the write protect switch 24 that is formed when the button 34 is moved toward the connection terminal 36. Thus, in one embodiment the reader/mobile adapter 26 is a write enabled only reader that is coupleable with the data storage cartridge 22 only when the write protect switch 24 is in the write enabled position (as shown in FIG. 4).

Figure 5:
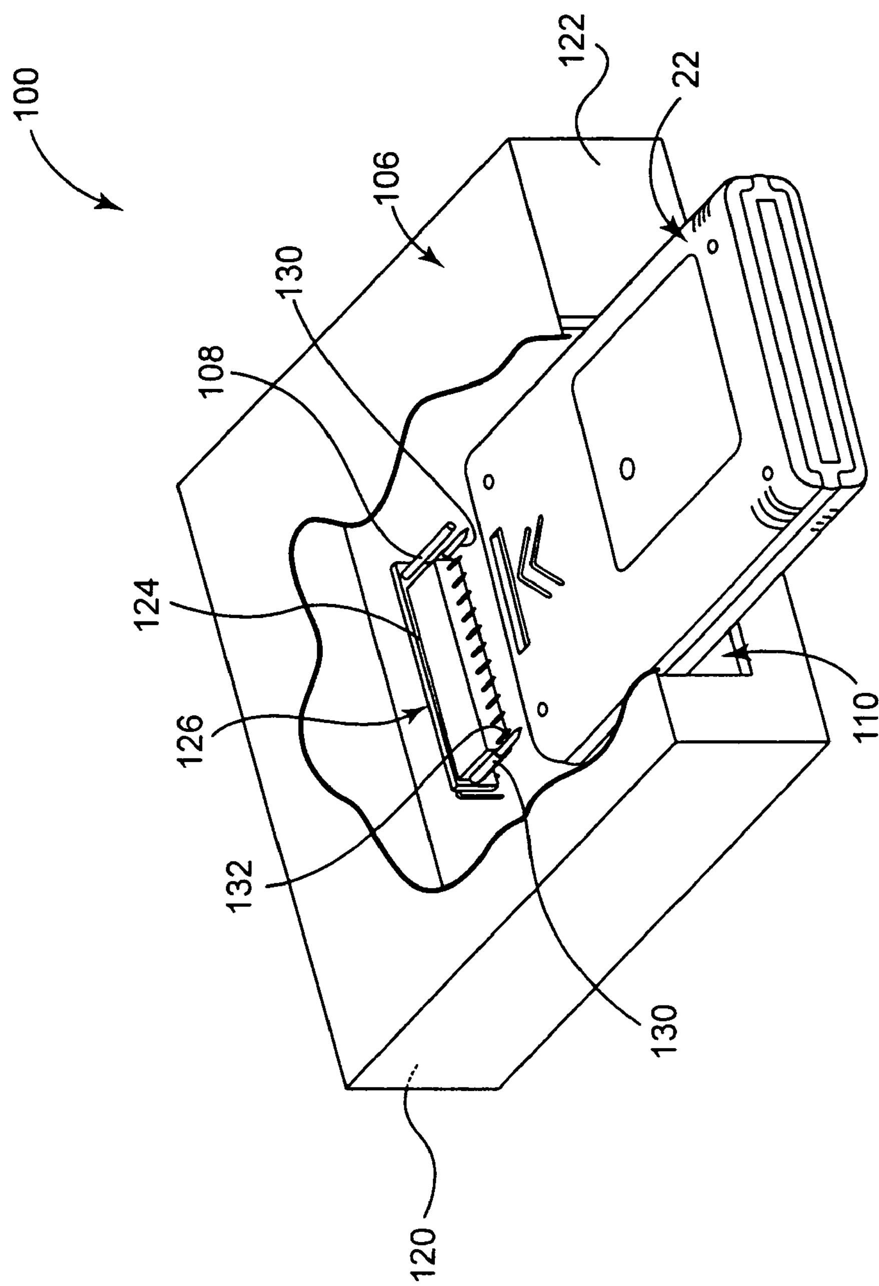
FIG. 5 is a perspective view of a removable hard disk drive storage system including a docking station and a data storage cartridge according to another embodiment.

FIG. 5 is a perspective view of a removable hard disk drive storage system 100 according to another embodiment. Removable hard disk drive storage system 100 (system 100) includes the data storage cartridge 22 described above and a reader 106 including a physical block 108 that aligns with the write protect switch 24 (FIG. 1) of the data storage cartridge 22. The physical block 108 is configured to prevent the reader 106 from read/write coupling to the data storage cartridge 22, and thus prevent data access with the data storage cartridge 22 when the write protect switch 24 is in the write protect position (as shown in FIG. 1).

In one embodiment, the reader 106 includes a docking station defining a bay 110 that is configured to receive the data storage cartridge 22. The physical block 108 or interposer 108 is disposed inside of the bay 110. In particular, in one embodiment the reader/docking station 106 includes a first end 120 opposite a second end 122, where the second end 122 defines an opening into the bay 110. The bay 110 extends from the opening defined in the second end 122 to an interior surface 124 opposite the second end 122. A connector 126 is coupled to the interior surface 124 and is configured to electrically couple with the connection terminal 36 on the data storage cartridge 22. In one embodiment, the connector 126 includes alignment pins 130 and connector pins 132. The alignment pins 130 are configured to insert within the apertures 46 (FIG. 1) and align the connector 126 with the connection terminal 36 during read/write connection of the data storage cartridge 22 with the reader/docking station 106. To this end, the connector 126 defines a connector interface that is coupleable to the data storage cartridge 22.

Figure 6:
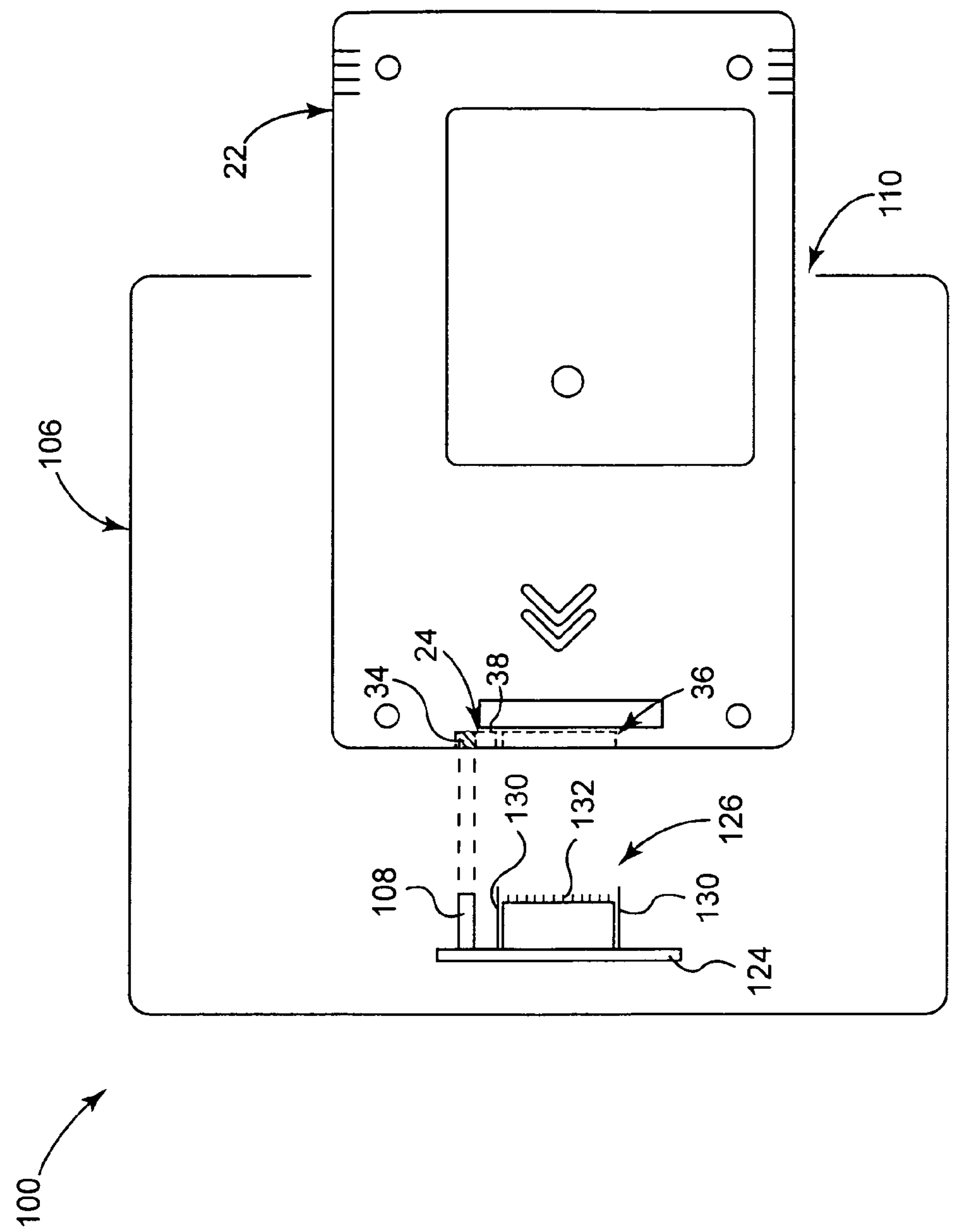
FIG. 6 is a top view of the docking station shown in FIG. 5 configured to prevent coupling with a write protected data storage cartridge according to one embodiment.

FIG. 6 is a top view of the system 100 having a top portion of the docking station 106 removed to enable viewing of the connector 126. The write protect switch 24 of the data storage cartridge 22 is in the write protect position in which the button 34 is slid within the channel 38 to the furthest point away from the connection terminal 36 (as shown in FIG. 1). The physical block 108 aligns with the button 34 and prevents the data storage cartridge 22 from electrically coupling with the connector 26.

Figure 7:
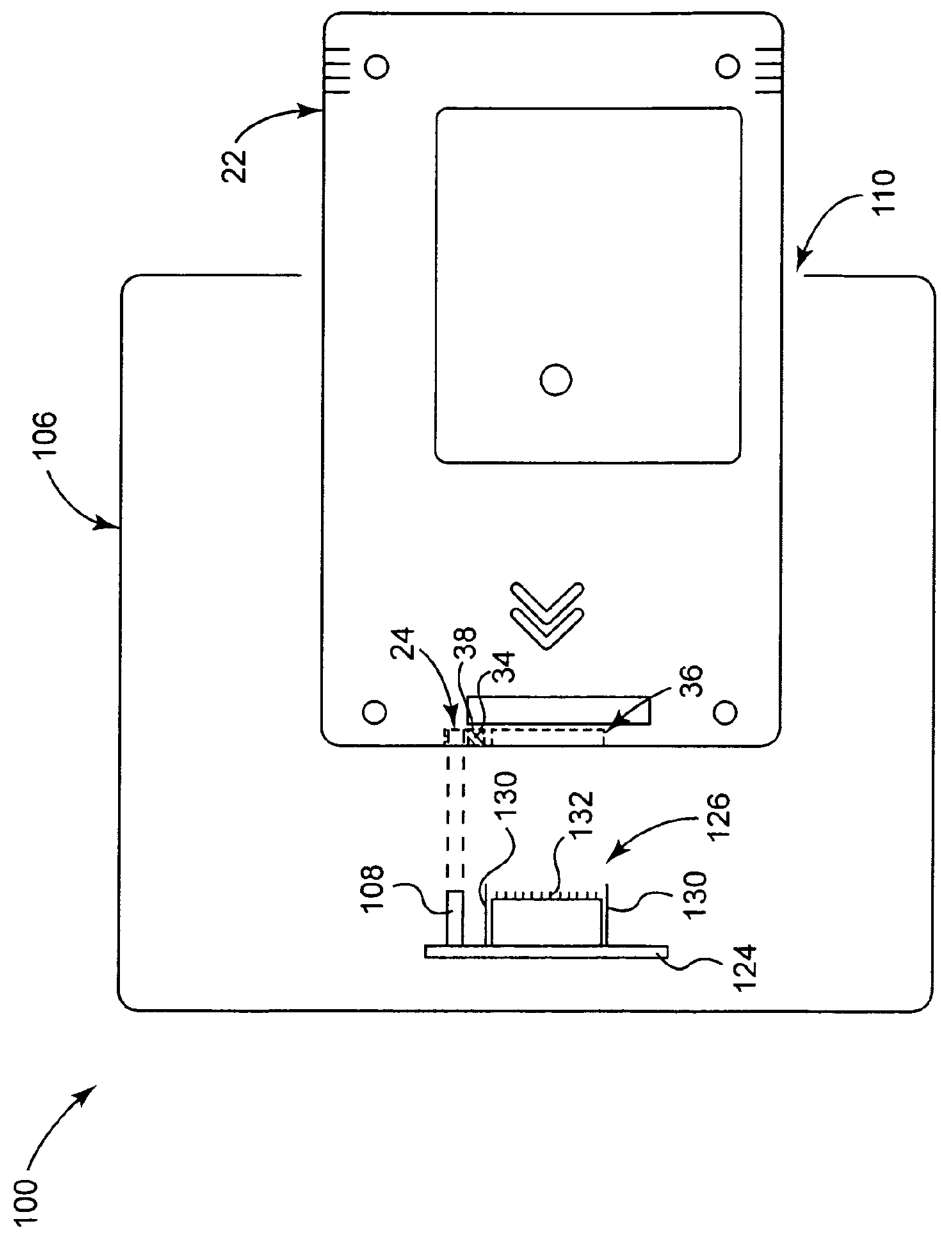
FIG. 7 is a top view of the docking station shown in FIG. 5 configured to enable coupling with a write enabled data storage cartridge according to one embodiment.

FIG. 7 is a top view of the data storage cartridge 22 inserted into the bay 110 of the docking station 106. The button 34 of the write protect switch 24 has been moved within the channel 38 toward the connection terminal 36 and is in a write enabled mode. The physical block 108 is configured to align with a void formed in the channel 38 when the button 34 is moved to the write enabled position and out of alignment with the physical block 108. To this end, the write enabled data storage cartridge 22 is suited for electrically coupling in a read/write manner with the connector 126 to enable the docking station 106 to read data off of the data storage cartridge 22.

Embodiments provide a physical block in the form of a post or an interposer that prevents a reader from coupling with a write-protected data storage cartridge. The physical block configures the reader to be a write-enabled only reader. Embodiments provide a simple, elegant, cost effective solution that prevents a user of the data storage cartridge from inadvertently overwriting data saved on the cartridge.

Although specific embodiments have been illustrated and described herein, it will be appreciated by those of ordinary skill in the art that a variety of alternate and/or equivalent implementations may be substituted for the specific embodiments shown and described without departing from the scope of the present invention. This application is intended to cover any adaptations or variations of preventing read devices from connecting with write protected data cartridges as discussed herein. Therefore, it is intended that this invention be limited only by the claims and the equivalents thereof.

What is claimed is:

1. A removable hard disk drive storage system comprising:

a data storage cartridge that includes a write protect switch; and a reader configured to electrically couple to and read data from the data storage cartridge, wherein the reader includes an interface;

wherein the reader includes a physical block that aligns with the write protect switch of the data storage cartridge to prevent the interface of the reader from electrically coupling to the data storage cartridge when the write protect switch is in a write protect position.

2. The removable hard disk drive storage system of claim 1, wherein the reader comprises a docking station defining a bay configured to receive the data storage cartridge, the physical block disposed inside the bay and configured to prevent the data storage cartridge from being electrically coupled with the interface of the reader when the write protect switch is in the write protect position.

3. The removable hard disk drive storage system of claim 2, wherein the docking station comprises opposing first and second ends, the second end defining an opening into the bay, the bay extending from the opening defined in the second end to an interior surface of the docking station, and the physical block extending from the interior surface toward the second end.

4. The removable hard disk drive storage system of claim 3, wherein the physical block comprises a rigid post coupled to and extending from the interior surface.

5. The removable hard disk drive storage system of claim 1, wherein the interface of the reader comprises a mobile adaptor configured to electrically communicate with the data storage cartridge, the physical block disposed on a connector face of the mobile adaptor and configured to prevent the data storage cartridge from being electrically coupled with the mobile adaptor.

6. The removable hard disk drive storage system of claim 5, wherein the mobile adaptor comprises:

a cartridge connector including SATA contacts;

a data port; and a cable extending between the cartridge connector and the data port;

wherein the SATA contacts of the cartridge connector are configured to electrically communicate with contacts on the data storage cartridge and the data port is configured to electrically communicate with a host memory device.

7. The removable hard disk drive storage system of claim 6, wherein the cartridge connector comprises a snap mechanism that is attachable to the data storage cartridge, the snap mechanism comprising a first flange coupled to a first major surface of the cartridge connector, a second flange coupled to a second major surface of the cartridge connector opposite the first major surface, and the connector face extending between the first and second flanges.

8. The removable hard disk drive storage system of claim 7, wherein the first and second flanges are substantially parallel and spaced apart to define a gap between the first and second flanges.

9. The removable hard disk drive storage system of claim 8, wherein the physical block comprises a post disposed in the gap, the post extending from the connector face substantially parallel to the first and second flanges.

10. The removable hard disk drive storage system of claim 8, wherein the post extends perpendicularly from the connector face.

11. The removable hard disk drive storage system of claim 1, wherein the reader comprises a write-enabled only reader.

12. The removable hard disk drive storage system of claim 11, wherein the reader is unable to sense a status of the write protect switch.

13. A removable hard disk drive storage system comprising:

a data storage cartridge that includes a write protect switch; and a reader comprising an interface that is electrically coupleable to the data storage cartridge;

wherein the interface includes an interposer that extends from the interface, the interposer configured to prevent the interface of the reader from electrically coupling to the data storage cartridge only when the write protect switch is in a write protect position.

14. The removable hard disk drive storage system of claim 13, wherein the interposer is fixed relative to the interface.

15. The removable hard disk drive storage system of claim 13, wherein the interposer comprises a rigid post integrally formed with the interface.

16. The removable hard disk drive storage system of claim 13, wherein the reader comprises a write-enabled only reader.

17. A method of preventing data from being inadvertently overwritten on a data storage cartridge, the method comprising:

providing a removable data storage system including at least one data cartridge and a read device that electrically connects with the at least one data cartridge prior to transferring data with the at least one data cartridge; and preventing the read device from electrically connecting with the at least one data cartridge when the at least one data cartridge is write protected and physically coupled to the read device.

18. The method of claim 17, wherein the at least one data cartridge comprises a plurality of data cartridges including write enabled and write protected data cartridges, and the read device comprises a write enabled only device.

19. The method of claim 17, wherein preventing the read device from electrically connecting with the at least one data cartridge comprises forming an interposer on the read device that blocks write protected data cartridges from electrically coupling with the read device.

20. The method of claim 19, wherein forming an interposer on the read device comprises forming a rigid post extending from a cartridge interface of the read device, the rigid post configured to contact a write protect switch of each of the write protected data cartridges.

* * * * *